United States Patent
Knopp

(10) Patent No.: US 10,358,292 B1
(45) Date of Patent: Jul. 23, 2019

(54) ELASTIC CONVEYOR BELT AND TRANSPORT SYSTEM

(71) Applicant: WALLROTH F & E UG (HAFTUNGSBESCHRÄNKT), Arzbach (DE)

(72) Inventor: Hans Werner Knopp, Großholbach (DE)

(73) Assignee: WALLROTH F & E UG (HAFTUNGSBESCHRÄNKT) (DE)

( * ) Notice: Subject to any disclaimer, the term of this patent is extended or adjusted under 35 U.S.C. 154(b) by 0 days.

(21) Appl. No.: 16/112,982

(22) Filed: Aug. 27, 2018

(30) Foreign Application Priority Data

Jul. 5, 2018 (DE) .................. 10 2018 116 347

(51) Int. Cl.
| | |
|---|---|
| B65G 15/30 | (2006.01) |
| B65G 15/34 | (2006.01) |
| B65G 15/46 | (2006.01) |
| B65G 15/64 | (2006.01) |

(52) U.S. Cl.
CPC ............ *B65G 15/64* (2013.01); *B65G 15/30* (2013.01); *B65G 15/34* (2013.01); *B65G 15/46* (2013.01)

(58) Field of Classification Search
CPC ........ B65G 15/30; B65G 15/32; B65G 15/34; B65G 15/36; B65G 15/42; B65G 15/46; B65G 15/60; B65G 15/62; B65G 15/64
See application file for complete search history.

(56) References Cited

U.S. PATENT DOCUMENTS

| | | | | |
|---|---|---|---|---|
| 2,896,773 A | * | 7/1959 | Syce ................... | B65G 15/42 198/821 |
| 3,343,652 A | * | 9/1967 | Thomson ............. | B65G 15/42 198/833 |
| 3,545,822 A | * | 12/1970 | Gremeret ............. | B62D 55/24 305/179 |
| 3,630,340 A | * | 12/1971 | Bouzat ................ | B65G 15/34 198/818 |

(Continued)

FOREIGN PATENT DOCUMENTS

| | | | | |
|---|---|---|---|---|
| DE | 102013205997 A1 | * | 10/2014 | ............. B65G 15/46 |
| EP | 2679522 A1 | | 1/2014 | |

(Continued)

OTHER PUBLICATIONS

"Patent Translate DE 102013205997" EPO and Google. (Year: 2018).*
"Patent Translate FR 2531934" EPO and Google. (Year: 2018).*

*Primary Examiner* — Mark A Deuble
(74) *Attorney, Agent, or Firm* — Schmeiser, Olsen & Watts, LLP

(57) ABSTRACT

Provided is an elastic conveyor belt for a transport system for conveying goods in a conveying direction along a conveyor belt plane of the conveyor belt, the conveyor belt including, on a carrying side of the conveyor belt, a carrying surface which is oriented along the conveyor belt plane and is intended for carrying the goods, and, on a guide side of the conveyor belt, a guide surface which is oriented along the conveyor belt plane and is intended for guiding the conveyor belt, and, in the guide surface, at least one groove for the engagement of a guide element for guiding the conveyor belt along the conveying direction, a longitudinal axis of the groove being oriented along the conveying direction.

9 Claims, 4 Drawing Sheets

(56) References Cited

U.S. PATENT DOCUMENTS

| | | | | |
|---|---|---|---|---|
| 3,941,238 A | * | 3/1976 | Lapeyre | B65G 15/46 198/811 |
| 4,011,939 A | * | 3/1977 | Conrad | B65G 15/46 198/840 |
| 4,899,872 A | * | 2/1990 | Hokao | B65G 15/46 198/840 |
| 5,507,382 A | * | 4/1996 | Hartwell | B65G 15/46 198/806 |
| 5,911,307 A | * | 6/1999 | Kraft | B65G 15/64 198/846 |
| 8,464,862 B2 | * | 6/2013 | Honeycutt | B65G 15/42 198/822 |
| 2015/0075130 A1 | * | 3/2015 | Ryz | A01F 15/18 56/341 |

FOREIGN PATENT DOCUMENTS

| | | | | |
|---|---|---|---|---|
| FR | 2531934 A1 | * | 2/1984 | B65G 15/36 |
| GB | 1039312 A | | 8/1966 | |
| GB | 1545063 A | * | 5/1979 | A01D 61/02 |

* cited by examiner

ELASTIC CONVEYOR BELT AND TRANSPORT SYSTEM

CROSS-REFERENCE TO RELATED APPLICATIONS

This application claims priority to DE 10 2018 116 347.9, having a filing date of Jul. 5, 2018, the entire contents of which are hereby incorporated by reference.

FIELD OF TECHNOLOGY

The following relates to an elastic conveyor belt for a transport system for conveying goods in a conveying direction along a conveyor belt plane of the conveyor belt. On a carrying side of the conveyor belt, the conveyor belt comprises at least one carrying surface which is oriented along the conveyor belt plane and is intended for carrying the goods, and on a guide side of the conveyor belt said belt comprises at least one guide surface which is oriented along the conveyor belt plane and is intended for guiding the conveyor belt. In the guide surface, the conveyor belt comprises at least one groove for the engagement of a guide element for guiding the conveyor belt along the conveying direction, a longitudinal axis of the groove being oriented along the conveying direction.

The following relates to a transport system comprising an elastic conveyor belt for conveying goods in a conveying direction along a conveyor belt plane of the conveyor belt.

BACKGROUND

A variety of conveyor belts is well-known from the known art, said conveyor belts generally being continuous and thus being arranged so as to rotate around a frame. In this case, the conveyor belts are guided and deflected on rollers of deflection and/or drive means mounted in the frame, and are optionally also driven thereby.

In order that a conveyor belt can be guided on a roller in a defined manner, in particular transversely to the conveying direction of said belt, rollers for this purpose are often spherical, resulting in the effect of the conveyor belt being retained and guided substantially centrally on said spherical region during operation. A disadvantage of spherical rollers of this kind is that dirt can accumulate, along the lateral regions of the conveyor belt, between said belt and the spherical roller, which may adversely affect the guide effect, meaning that required directional control of the conveyor belt can no longer be adequately ensured, with the result that, in the worst case, the conveyor belt may run down laterally from the spherical roller and come off.

With regard to another structural solution, it is known to provide rollers that lean slightly towards one another, in order for it to be possible to support the edge regions of a conveyor belt element on both sides, viewed in the conveying direction, so that the conveyor belt can be prevented from migrating transversely to the conveying direction. However, this solution is extremely complex owing to the plurality of rollers required.

With regard to a particularly simple embodiment of a transport system comprising a conveyor belt, the conveyor belt can for example form merely an upper run and a lower run that are guided so as to be substantially mutually parallel.

Document GB1039312A discloses a transport system comprising a continuous belt. Said belt comprises elevations that extend in the longitudinal direction. The subject matter of GB1039312A further comprises a roller for guiding the continuous belt, which roller comprises parallel furrows in the peripheral direction, which furrows can engage in the furrows of the belt. Substantially U-shaped furrows are described as a particular form.

A disadvantage in this case is that roller belts of this kind do not have optimal grip on the rollers, and, as a result, friction losses may occur. In addition, the accuracy of the fit between the furrows in the belt and the elevations on the rollers may be adversely affected in the case of shifts in temperature. Care should be taken, during assembly and production, to ensure a particularly accurate fit.

EP2679522A1 describes a conveyor belt element for conveying goods, comprising an elastically bendable and planar main body that comprises a receiving surface for receiving the goods and comprises a track guide means for guiding the conveyor belt element on a support apparatus. The track guide means comprises one or more furrow elements that are in each case formed as a material weakening and that are arranged in the elastically bendable main body so as to extend in the movement direction of the conveyor belt element.

The furrow elements may be V-shaped or U-shaped. A disadvantage of furrow elements of this kind is that the contact surface between the support apparatus and the furrow elements is often poorly defined, in particular if the shape of the support apparatus is not exactly adapted to the shape of the furrow elements or deviates therefrom for example as a result of wear or dirt. This can result in inadequate guidance or increased wear, for example if only the edges of a support apparatus are in contact with the furrow elements.

Furthermore, in particular in the case of lateral compression of the conveyor belt element, for example if the conveyor belt element is loaded by goods to be conveyed or is guided around a curve, there is a risk of the support apparatus being jammed in a V-shaped or U-shaped furrow element, causing increased friction and wear, or of being pushed out of the furrow element, causing the guide effect to be lost.

SUMMARY

An aspect relates to creating a conveyor belt and a transport system that are simple and cost-effective to produce and that allow for reliable, efficient and low-maintenance conveying of goods.

An elastic conveyor belt according to embodiments of the invention is configured for a transport system for conveying goods in a conveying direction along a conveyor belt plane of the conveyor belt. Within the meaning of embodiments of the invention, a "conveyor belt" is an elastic, planar, for example substantially rectangular, body, the extension of which in the conveyor belt plane is substantially greater than the extension perpendicular thereto. A conveyor belt of this kind has two surface sides, one of which is generally used for carrying the goods, and two substantially smaller narrow sides and end faces in each case. A conveyor belt is generally elongate, an extension, in the conveying plane, along the conveying direction being substantially greater than an extension perpendicular thereto. In particular if the conveyor belt is used in a transport system, it can be bent such that different regions of the conveyor belt may comprise mutually different conveying planes and conveying directions.

Within the meaning of embodiments of the invention, the term "along" is used synonymously with "substantially parallel", for example to mean enclosing an angle of 0° to 10°, in particular 0° to 5°, preferably 0° to 2°.

On a carrying side of the conveyor belt, the conveyor belt comprises at least one carrying surface which is oriented along the conveyor belt plane and is intended for carrying the goods. The carrying side is preferably a surface side of the conveyor belt. In the simplest case, the carrying surface is designed such that the goods can be placed thereon. In particular, the entire carrying side may form the carrying surface in order to provide as large as possible a surface area for carrying the goods.

On a guide side of the conveyor belt, the conveyor belt comprises at least one guide surface which is oriented along the conveyor belt plane and is intended for guiding the conveyor belt. The guide side is preferably a surface side of the conveyor belt. In particular, the entire guide side may form the guide surface in order to provide as large as possible a surface area for guidance which is as precise and reliable as possible.

In the guide surface, the conveyor belt comprises at least one groove, for example one, two, three, four or more grooves, for the engagement of a guide element for guiding the conveyor belt along the conveying direction, a longitudinal axis of the groove being oriented along the conveying direction. The guide element may for example be in particular cylindrical bolt, or a web, the largest extension of which is oriented in the conveying direction and which for example has a rectangular cross-sectional area perpendicular to the conveying direction.

The at least one groove preferably extends along the conveying direction over the entire length of the guide surface in order to ensure guidance which is as reliable as possible and in order to prevent possible increased friction and/or increased wear of the guide element and/or of the conveyor belt at an end of the groove.

The at least one groove preferably comprises at least one base surface for defining a penetration depth of the guide element into the conveyor belt. The base surface provides a defined stop for the guide element, in particular for a guide element having an end which is shaped as desired, with the result that the conveyor belt is precisely and reliably guided at a defined spacing from the guide element.

Furthermore, there is a larger contact surface between the guide element and the groove, for example compared with a V-shape, and therefore local mechanical stress of the guide element and conveyor belt is reduced. As a result, it is possible for example to use a less wear-resistant material for the guide element or the conveyor belt. The material can thus be selected so as to reduce costs or weight, for example.

Moreover, in the case of a groove comprising a base surface, there is less likelihood, for example compared with a V-shaped groove, of foreign substances collecting in the groove or of the guide element jamming in the groove, which would both increase the wear.

In addition, a groove comprising a base surface is less deep than a V-shaped groove at the same opening width and the same flank angle. The conveyor belt is thus mechanically weakened to a lesser extent by a groove comprising a base surface, and has a longer service life and/or higher mechanical load capacity.

The at least one groove preferably comprises at least one left-hand flank surface which is arranged obliquely to the conveyor belt plane, connects the guide surface to the base surface, and is intended for left-hand directional control of the guide element, and/or at least one right-hand flank surface which is arranged obliquely to the conveyor belt plane, connects the guide surface to the base surface, and is intended for right-hand directional control of the guide element. In this case, a base width of the base surface perpendicular to the conveying direction is less than an opening width of the groove perpendicular to the conveying direction and in a plane together with the guide surface. The groove thus widens from the base surface towards the guide surface.

A groove that widens towards the guide surface results in that the groove, and thus the conveyor belt, is automatically aligned on the guide element when the guide element engages laterally to the conveying direction. Which is to say that the guide element can engage in the groove so as to reliably guide the conveyor belt even in the case of deviations between the width or the lateral position of the guide element and the width or the lateral position of the base surface of the groove, for example as a result of elongation or compression of the conveyor belt, manufacturing tolerances or wear.

The further advantage of a groove that widens towards the guide surface is that a gap remains between the guide element and the conveyor belt, laterally to the conveying direction, and therefore the guide element does not jam in the groove, even in the event of lateral compression of the conveyor belt.

The base surface is preferably oriented along the conveyor belt plane. As a result, the penetration depth of the guide element into the groove is the same over the entire base surface, allowing for particularly reliable guidance.

The left-hand flank surface may transition into the base surface in a left-hand transition region, and the right-hand flank surface may transition into the base surface in a right-hand transition region, wherein the left-hand transition region and/or the right-hand transition region can be formed as an edge. An edge is advantageous in that, in contrast to a rounded transition, it inhibits a lateral movement of the guide element out of the groove, along the conveying plane, perpendicularly to the conveying direction. As a result, particularly reliable guidance is achieved, in particular in the case of lateral stress, for example when the conveyor belt is guided around a curve.

If the flank surfaces each transition into the base surface at an edge, for example the base surface and the flank surfaces can be planar and thus easy and cost-effective to produce. A planar base surface and planar edge surfaces result in a groove having a trapezoidal cross-sectional area, perpendicular to the conveying direction.

The base surface, the left-hand flank surface and/or the right-hand flank surface are preferably planar, i.e. not curved, and can therefore be produced simply and cost-effectively, in particular by means of subtractive methods, for example by milling. Furthermore, planar surfaces form particularly large contact surfaces for contact with conventional guide elements having a rectangular cross section, improving the guidance and reducing the local material stress.

For example, in order to adapt to a rounded guide element, the base surface, the left-hand flank surface and/or the right-hand flank surface may be curved, preferably concavely curved towards the groove, about the longitudinal axis.

According to an embodiment which is alternative to the embodiment according to the invention of the transition regions, in particular as edges, it is further proposed that the left-hand transition region and the right-hand transition region are rounded, i.e. formed without edges. Entirely omitting edges in the at least one groove prevents possible accumulation of foreign substances or increased material stress in the edge region.

In order to connect the base surface to the guide surface, the flank surfaces and/or the base surface have to be curved in this alternative embodiment. Preferably only the flank surfaces are curved, in order to allow for the above-mentioned advantages of a planar base surface.

The features and combinations of features disclosed with regard to the embodiment according to the invention of the transition regions can be combined analogously with this alternative embodiment and have equivalent advantages.

In particular, in this alternative embodiment, the flank surfaces and the base surface may be curved, for example resulting in a groove having a cross section, perpendicular to the conveying direction, in the form of a sector of a circle, for example a semicircle. The advantage of a cross section in the shape of a sector of a circle is that of particularly uniform distribution of mechanical stresses, and therefore low wear.

Within the context of an embodiment having transition regions according to embodiments of the invention, in particular formed as edges, the left-hand flank surface can enclose a left-hand flank angle, together with the guide surface, and the right-hand flank surface can enclose a right-hand flank angle, together with the guide surface, the left-hand flank angle and the right-hand flank angle in each case preferably being between 40° and 90°, particularly preferably between 50° and 85°. Large flank angles allow for particularly reliable directional control of the guide element in the groove and reduce the risk of the guide element being pushed out of the groove in the event of compression of the conveyor belt.

In contrast, the above-described advantages of a groove that widens towards the guide surface come into effect in particular in the case of small flank angles. For practical applications, the angle ranges mentioned, between these opposing requirements, have been found to be particularly advantageous.

The carrying side is preferably opposite the guide side with respect to the conveyor belt plane. If the carrying side does not coincide with the guide side, the resulting advantage is that the carrying side can be formed without grooves and is therefore particularly easy to clean and/or to disinfect, which is advantageous in particular for conveying goods associated with strict hygiene requirements, for example food. If the carrying side and the guide side are mutually opposed, the carrying side and the guide side can thus each be formed by one of the surface sides of the conveyor belt, with the result that as large as possible a surface area is available both for carrying the goods and for guiding the conveyor belt.

The conveyor belt may comprise at least one material weakening that extends in an elongate manner in the conveying direction and is arranged beside the at least one groove with respect to the conveying direction. In the event of tensile or pressure stress of the conveyor belt, in particular along the conveying plane, perpendicular to the conveying direction, for example if the conveyor belt is guided around a curve or spread, the material weakening leads to deformation of the conveyor belt, primarily in the region of the material weakening. The groove is consequently deformed only slightly, and therefore precise guidance of the conveyor belt without the guide element jamming in the groove is still possible.

The material weakening may be formed for example as a thinning of the conveyor belt, as a perforation of the conveyor belt, and/or as material of the conveyor belt which is less rigid than the material outside of the material weakening.

The conveyor belt may comprise at least one guide layer that contains the at least one groove, and at least one carrying layer that forms the carrying surface. A multi-layer structure makes it possible to optimize the material properties of the individual layers for different requirements. For example, the guide layer may consist of a material in which the groove can easily be introduced, and/or which has a low coefficient of friction against the guide element. The carrying layer may for example consist of a material which is easy to clean and/or disinfect and/or that allows for a high load-bearing capacity of the conveyor belt.

A reinforcing layer may be arranged between the guide layer and the carrying layer, which reinforcing layer may consist for example of a more rigid and/or stronger material, in order to ensure a high load-bearing capacity and to prevent plastic deformation of the conveyor belt which may render said belt unusable.

The layers are preferably arranged along the conveying plane and/or are rigidly, in particular integrally, interconnected, for example are adhesively bonded and/or welded to one another.

In order to allow for particularly simple production, the base surface may be formed by a boundary between the guide layer and the reinforcing layer or the carrying layer which is free in the region of the groove. In this case, the conveyor belt can be produced for example by introducing the at least one groove as a continuous slot in the guide layer before or after connection of the guide layer to the reinforcing layer or the carrying layer.

The conveyor belt may comprise at least one elastic plastics material, preferably a reinforced, in particular fiber-reinforced, plastics material. The layers of the conveyor belt may in particular consist of different plastics materials. For example, the reinforcing layer may comprise a fiber-reinforced plastics material.

According to an embodiment of the invention, the conveyor belt element may comprise at least two grooves, a spacing of the grooves perpendicular to the conveying direction along the conveyor belt plane being greater than or equal to the opening width and/or a groove depth, perpendicular to the conveyor belt plane, of at least one of the two grooves. Due to the fact that the grooves are arranged so as to be at a sufficient spacing from one another, a sufficiently large drive surface results between the grooves, on which surface a drive roller, for example, can engage in order to drive the conveyor belt with sufficient traction. The drive surface is preferably planar.

A groove depth of the at least one groove perpendicular to the conveyor belt plane is preferably at least 30%, preferably at least 50%, particularly preferably at least 70%, of a conveyor belt thickness perpendicular to the conveyor belt plane. Particularly reliable guidance can be achieved thereby.

A transport system according to embodiments of the invention comprises an elastic conveyor belt for conveying goods in a conveying direction along a conveyor belt plane of the conveyor belt.

The conveyor belt of the transport system is a conveyor belt according to embodiments of the invention, resulting in the advantages and design options described in relation thereto.

The transport system may comprise at least one guide element, the guide element being configured to engage in the at least one groove of the conveyor belt in order to guide the conveyor belt along the conveying direction. For example, the conveyor belt can be guided past the guide element such that the guide element engages in the at least one groove.

The opening width of the at least one groove is preferably greater than a width of the guide element in parallel with the opening width. As a result, the guide element can engage in the groove in a simple and reliable manner, and without jamming; in particular even if the guide element is not positioned exactly on the groove, for example owing to manufacturing tolerances or deformations of the conveyor belt, or if the opening width is reduced due to compression of the conveyor belt. The opening width can for example be 110% to 200%, in particular 130% to 180%, of the width of the guide element.

The base width of the at least one groove is preferably 100% to 150%, more preferably 110% to 130%, of a width of the guide element in parallel with the base width. As in the case of the opening width, a sufficiently large base width also ensures simple, reliable and non-jamming engagement of the guide element in the groove. In addition, the base width also should not be too large, in order that reliable directional control of the guide element is ensured. Therefore, for practical applications, the value ranges mentioned have been found to be particularly advantageous, wherein the base width is for example 2 mm to 8 mm, in particular 3 mm to 4 mm.

The guide element may be designed as a guide bolt or a guide web and can preferably be arranged on a lateral surface of a roller for deflecting and/or driving the conveyor belt, and/or on a support surface for the conveyor belt. In particular, the guide element may be designed as an outer surface web of the roller that extends in the peripheral direction. Track guidance of the conveyor belt on the roller which is particularly simple to construct and very reliable in operation can be achieved thereby.

All the features disclosed in the application documents are claimed as essential to embodiments of the invention, provided that they are novel over the known art, either individually or in combination.

BRIEF DESCRIPTION

Some of the embodiments will be described in detail, with references to the following Figures, wherein like designations denote like members, wherein:

FIG. 1A schematically shows an embodiment of a conveyor belt;

FIG. 1B is a perspective section of an embodiment according to the invention of a conveyor belt;

FIG. 2A schematically shows a further embodiment of a conveyor belt;

FIG. 2B is a perspective section of a further embodiment according to the invention of a conveyor belt;

FIG. 3A schematically shows a conveyor belt comprising an embodiment of the transition regions which is an alternative to an embodiment;

DETAILED DESCRIPTION

Figure 1A:
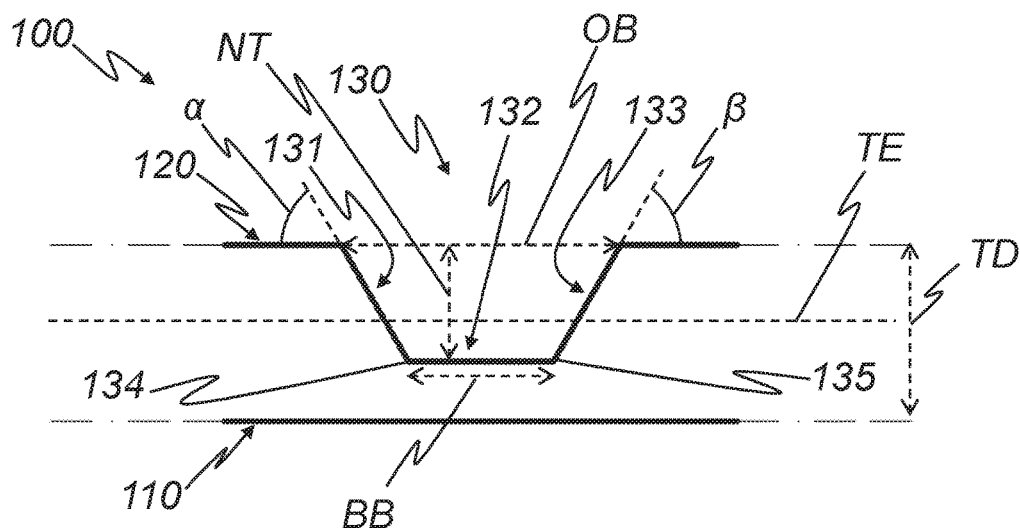
Figure 1B:
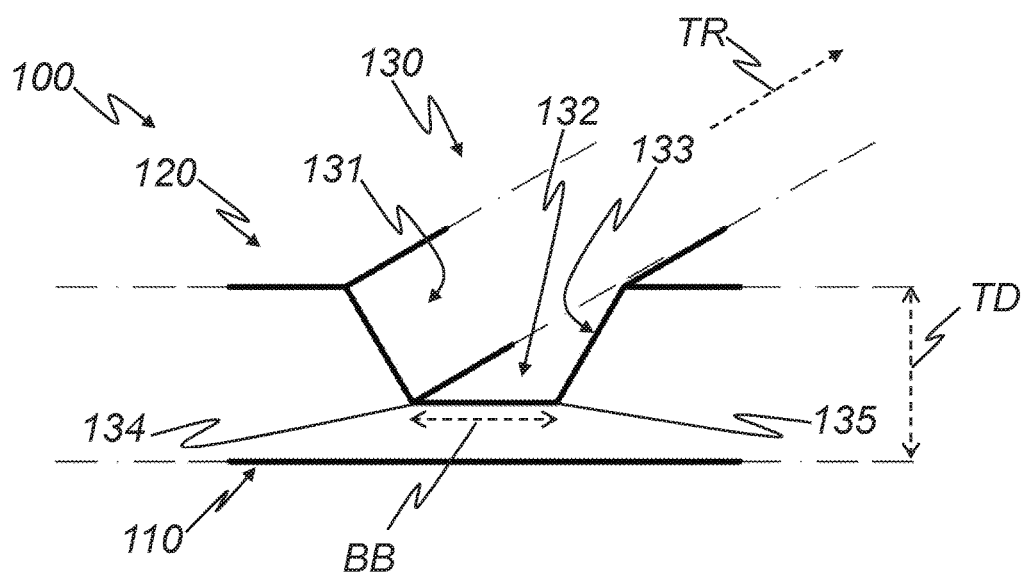

FIG. 1A is a schematic cross section and FIG. 1B is a perspective section of an embodiment according to the invention of a conveyor belt 100. The conveyor belt 100 is designed for a transport system (not shown) for conveying goods (not shown) in a conveying direction TR along a conveyor belt plane TE of the conveyor belt 100. In the cross-sectional view, the conveying plane TE and the conveying direction TR are perpendicular to the drawing plane.

On a carrying side of the conveyor belt 100, the conveyor belt 100 comprises a carrying surface 110 which is oriented along the conveyor belt plane TE and is intended for carrying the goods, and on a guide side of the conveyor belt 100 said belt comprises a guide surface 120 which is oriented along the conveyor belt plane TE and is intended for guiding the conveyor belt 100. The carrying side is for example opposite the guide side with respect to the conveyor belt plane TE.

The guide surface 120 comprises a groove 130 for the engagement of a guide element (not shown), a longitudinal axis (not shown) of the groove 130 being oriented along the conveying direction TR.

The groove 130 comprises a base surface 132 for defining a penetration depth of the guide element into the conveyor belt 100, and a left-hand flank surface 131 which is arranged obliquely to the conveyor belt plane and connects the guide surface 120 to the base surface 132, and at least one right-hand flank surface 133 which is arranged obliquely to the conveyor belt plane TE and connects the guide surface 120 to the base surface 132.

A base width BB of the base surface 132 perpendicular to the conveying direction TR is less than an opening width OB of the groove 130 perpendicular to the conveying direction TR and in a plane together with the guide surface 120.

A groove depth NT of the groove 130 perpendicular to the conveyor belt plane TE is for example at least 50% of a conveyor belt thickness TD perpendicular to the conveyor belt plane TE.

The base surface 132 is for example planar and oriented along the conveyor belt plane TE, the left-hand flank surface 131 transitioning into the base surface 132 in a left-hand transition region 134, and the right-hand flank surface 133 transitioning into the base surface in a right-hand transition region 135, said transition regions each being in the form of an edge.

The left-hand flank surface 131 and the right-hand flank surface 133 are preferably planar, and the left-hand flank surface 131 encloses a left-hand flank angle $\alpha$ with the guide surface 120, and the right-hand flank surface 133 encloses a right-hand flank angle $\beta$ with the guide surface 120, the left-hand flank angle $\alpha$ and the right-hand flank angle $\beta$ in each case being between 50° and 85° for example.

In the embodiment shown, the groove 130 is for example trapezoidal in cross section, perpendicular to the conveying direction TR.

Figure 2A:
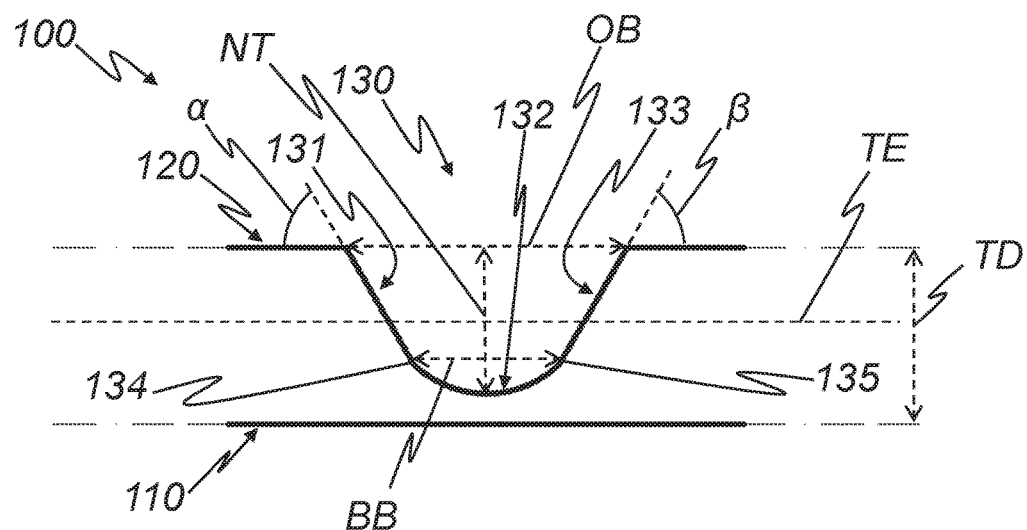
Figure 2B:
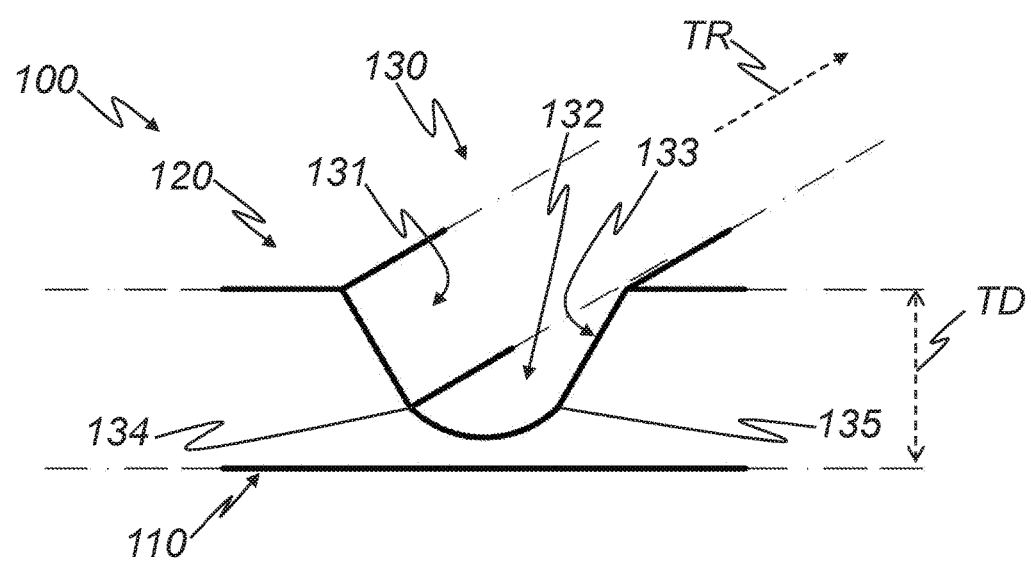

FIG. 2A is a schematic cross section and FIG. 2B is a perspective section of a further embodiment according to the invention of a conveyor belt 100. In the cross-sectional view, the conveying plane TE and the conveying direction TR are perpendicular to the drawing plane.

The conveyor belt 100 shown in FIGS. 2A and 2B differs from the conveyor belt 100 shown in FIGS. 1A and 1B in that the base surface 132 is not planar but instead is curved concavely towards the groove 130, about the longitudinal axis of the groove 130.

Figure 3A:
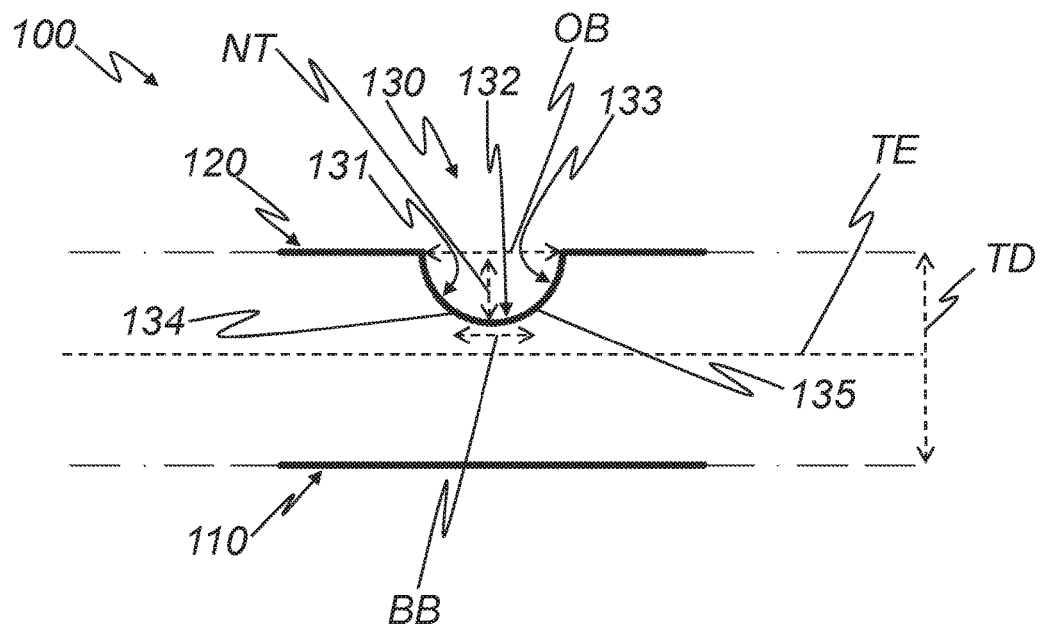
FIG. 3B is a perspective section of a conveyor belt.

FIG. 3A is a schematic cross section and FIG. 3 B is a perspective section of a conveyor belt 100 comprising an embodiment of the transition regions 134, 135 which is an alternative to an embodiment according to the invention. In the cross-sectional view, the conveying plane TE and the conveying direction TR are perpendicular to the drawing plane.

Figure 3B:
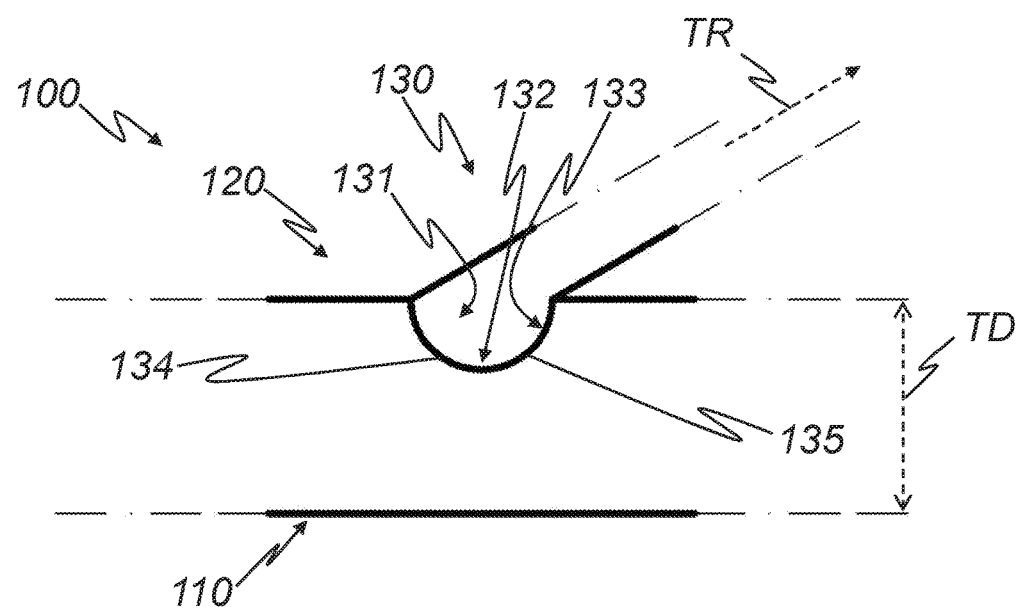

The conveyor belt 100 shown in FIGS. 3A and 3B differs from the conveyor belt 100 shown in FIGS. 2A and 2B in that the left-hand lateral surface 131 and the right-hand lateral surface 133 are not planar but instead are curved concavely towards the groove 130, about the longitudinal axis of the groove 130.

Furthermore, in a manner alternative to the embodiments according to the invention of the transition regions 134, 135, the left-hand transition region 134 and the right-hand transition region 135 are in each case not formed as edges but instead are rounded.

In the embodiment shown the groove 130 is for example semi-circular in cross section, perpendicular to the conveying direction TR.

Figure 4A:
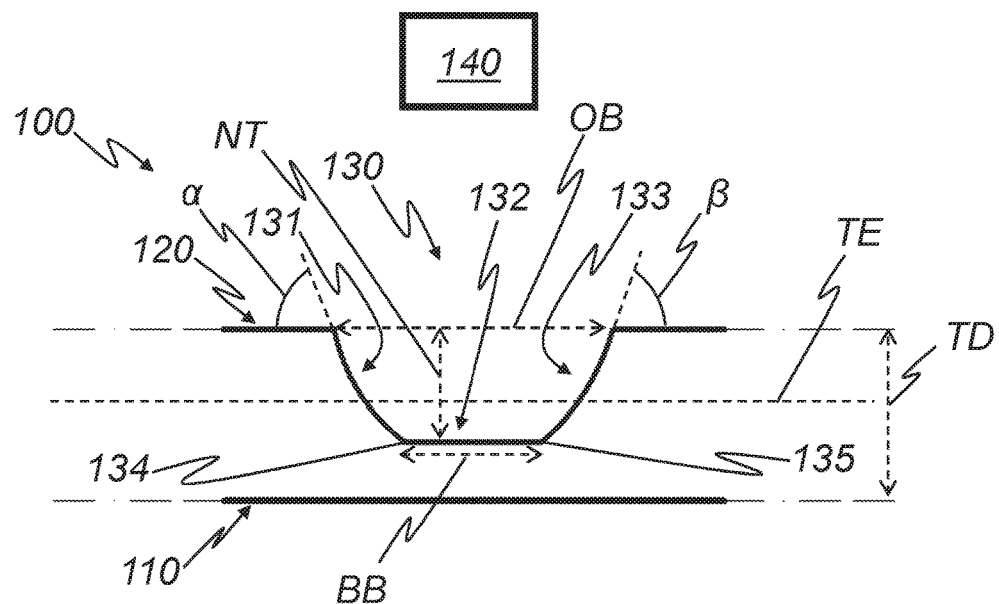
FIG. 4A is a schematic cross section of an embodiment of a transport system.
Figure 4B:
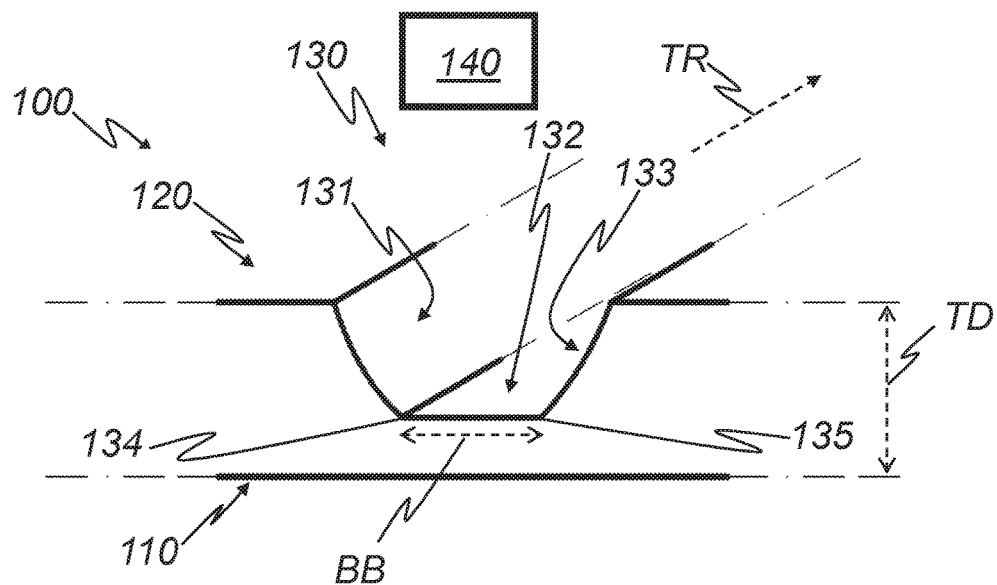
FIG. 4B is a perspective section of an embodiment of a transport system.

FIG. 4A is a schematic cross section and FIG. 4B is a perspective section of an embodiment according to the invention of a transport system comprising an embodiment according to the invention of a conveyor belt 100 and a guide element 140.

The conveyor belt 100 shown in FIGS. 4A and 4B is identical to the conveyor belt 100 shown in FIG. 1 except for the fact that the right-hand flank surface 131 and the left-hand flank surface 133 are not planar but concavely curved towards the groove 130 about the longitudinal axis of the groove 130. The base surface 132 is planar.

The guide element 140 is configured to engage in the groove 130 of the conveyor belt 100 in order to guide the conveyor belt 100 along the conveying direction TR.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCE CHARACTERS 100 conveyor belt
110 carrying surface
120 guide surface
130 groove
131 left-hand flank surface
132 base surface
133 right-hand flank surface
134 left-hand transition region
135 right-hand transition region
140 guide element
BB base width
NT groove depth
OB opening width
TD conveyor belt thickness
TE conveyor belt plane
TR conveying direction
α left-hand flank angle
β right-hand flank angle

The invention claimed is:

1. An elastic conveyor belt for a transport system for conveying goods in a conveying direction along a conveyor belt plane of the conveyor belt, the conveyor belt comprising, a) on a carrying side of the conveyor belt, at least one carrying surface which is oriented along the conveyor belt plane and is intended for carrying the goods, and,
b) on a guide side of the conveyor belt, at least one guide surface which is oriented along the conveyor belt plane and is intended for guiding the conveyor belt, and,
c) in the guide surface, at least one groove for the engagement of a guide element for guiding the conveyor belt along the conveying direction, a longitudinal axis of the groove being oriented along the conveying direction, wherein the at least one groove d) comprises at least one base surface for defining a penetration depth of the guide element into the conveyor belt, and
e) at least one left-hand flank surface, which is arranged obliquely to the conveyor belt plane connecting the guide surface to the base surface, for left-hand directional control of the guide element, and
f) at least one right-hand flank surface, which is arranged obliquely to the conveyor belt plane connecting the guide surface to the base surface, for right-hand directional control of the guide element, wherein
g) a base width of the base surface perpendicular to the conveying direction is less than an opening width of the groove perpendicular to the conveying direction and in a plane together with the guide surface, wherein
h) the base surface is planar, and the right-hand flank surface and the left-hand flank surface are concavely curved towards the groove about the longitudinal axis.

2. The conveyor belt according to claim 1, wherein the base surface is oriented along the conveyor belt plane.

3. The conveyor belt according to claim 1, wherein
the left-hand flank surface transitions into the base surface in a left-hand transition region, and the right-hand flank surface transitions into the base surface in a right-hand transition region, wherein the left-hand transition region and/or the right-hand transition region is formed as an edge.

4. The conveyor belt according to claim 1, wherein a) the left-hand flank surface encloses an angle complimentary to a left-hand flank angle (α) together with the guide surface, and
b) the right-hand flank surface encloses an angle complimentary to a right-hand flank angle (β) together with the guide surface, wherein
c) the left-hand flank angle (α) and the right-hand flank angle (β) are between 50° and 85°.

5. The conveyor belt according to claim 1, wherein
the conveyor belt comprises at least one material weakening that extends in an elongate manner in the conveying direction and is arranged beside the at least one groove with respect to the conveying direction.

6. The conveyor belt according to claim 1, wherein
the conveyor belt comprises at least one guide layer that contains the at least one groove, and at least one carrying layer that forms the carrying surface, wherein a reinforcing layer is arranged between the carrying layer and the guide layer.

7. A transport system comprising an elastic conveyor belt for conveying goods in a conveying direction along a conveyor belt plane of the conveyor belt,
wherein a) the conveyor belt is designed according to claim 1, and
b) the transport system comprises at least one guide element, wherein the guide element is configured to engage in the at least one groove of the conveyor belt in order to guide the conveyor belt along the conveying direction.

8. The transport system according to claim 7, wherein
a) the opening width of the at least one groove is greater than a width of the guide element in parallel with the opening width, and/or
b) the base width of the at least one groove is 110% to 130% of a width of the guide element in parallel with the base width.

9. The transport system according to claim 7, wherein
the guide element is designed as a guide bolt or a guide web and is arranged on a lateral surface of a roller for deflecting and/or driving the conveyor belt.

\* \* \* \* \*